United States Patent [19]

Nossen et al.

[11] 4,224,679
[45] Sep. 23, 1980

[54] SIGNAL CORRELATION MEANS

[75] Inventors: Edward J. Nossen, Cherry Hill; Conrad H. Haber, Turnersville, both of N.J.

[73] Assignee: RCA Corporation, New York, N.Y.

[21] Appl. No.: 951,381

[22] Filed: Oct. 16, 1978

[51] Int. Cl.² .................. G06F 15/34; G06G 7/19
[52] U.S. Cl. ................................. 364/728; 364/819
[58] Field of Search .................. 364/728, 819–824

[56] References Cited

U.S. PATENT DOCUMENTS

| | | | |
|---|---|---|---|
| 3,604,911 | 9/1971 | Schmitt | 364/728 |
| 3,670,151 | 6/1972 | Lindsay et al. | 364/728 |
| 3,796,868 | 3/1974 | Kaul et al. | 364/728 |
| 3,831,013 | 8/1974 | Alsup et al. | 364/728 |
| 3,968,471 | 7/1976 | Savit | 364/728 X |
| 3,987,292 | 10/1976 | Means | 364/603 |
| 4,007,330 | 2/1977 | Winters | 178/88 |
| 4,020,283 | 4/1977 | Epstein | 364/728 X |
| 4,025,772 | 5/1977 | Constant | 364/728 |

*Primary Examiner*—Jerry Smith
*Attorney, Agent, or Firm*—Samuel Cohen; Robert L. Troike; Donald W. Phillion

[57] ABSTRACT

A means for reducing side lobe signals and noise signals generated in a correlator in N chip positions for correlating a received input signal with a reference signal. The coincidence and non-coincidence indicating signals of first and second halves of the chip positions of the correlator are added together separately and then subtracted one from the other, with the resulting difference signal then being rectified. Such rectified difference signal which contains the side lobe signals and the noise signals but not the desired correlator indicating signal, is subtracted from the total summed and rectified signals generated by all of the N chip positions of said correlator to produce a resultant signal with much of the side lobe signals and the noise signals cancelled out.

6 Claims, 8 Drawing Figures

SIGNAL CORRELATION MEANS

This invention relates generally to signal correlators and more specifically, to correlation configurations for the correlation of coded signals such as pseudo-random sequences in which most of the side lobes resulting from the correlation operation are cancelled out and much of the noise is also eliminated by cancellation.

Because of their random-like properties which permits an unambiguous autocorrelation function, pseudo-random noise (PN) sequences are employed extensively to obtain message synchronization, which can be, for example, a string of data bits or a television signal. Signals such as a data bit or a television sync pulse may be represented by a large number N of code chips.

The recognition of a received PN code signal is effected by comparing such received signal with a reference signal which has the same waveform configuration as the received PN code signal. Such comparison, known as auto-correlation, is effected by a correlator comprised of first and second registers each having N chip positions, equal to the number of chips in the PN code signal, and a voltage comparison means. The reference signal is stored in a first one of the registers (the reference signal register) and the received signal is continuously and serially shifted through the second register (the data register), which can be a shift register, after being digitized or quantized into bits or into time synchronous amplitude samples, at the rate of N samples per time period $T_o$, where $T_o$ is the length of the expected PN code signal and also the length of the reference signal.

The signal comparator means of the correlator compares the signal level in each chip position of the first register with the signal sample in the corresponding chip position in the second register after each chip (code bit) advance of the received signal. Coincidence of the signals in corresponding chips of the two registers occurs when the signal level in the chip of the data register falls within certain limits with respect to the signal level contained in the corresponding chip of the reference signal register. Generally, coincidence implies that the signals in corresponding chips are either both at a high level or both at a low level.

The signal comparator means generates a small current of a first polarity for each pair of corresponding chips having coincident signal levels and a current of the opposite polarity when non-coincidence of signals occurs. All of these signals are summed together to produce a resultant signal which is representative of the degree of coincidence (or non-coincidence). Maximum signal occurs at correlation of the received reference PN signals and indicates that synchronization has been obtained.

However, true acquisition of synchronization is often hampered by the generation of side lobe signals which are produced as the received signal is slid past the reference signal and a partial but false coincidence occurs, i.e., where the number of coincident pairs of corresponding chips substantially exceeds the number of non-coincident pairs of corresponding chips over some portions of the N chip positions in the correlator with a resulting peak of summed current, identified herein as a side lobe signal. If the magnitude of such side lobe signal exceeds the threshold noise level, the circuit will erroneously interpret such side lobe signal as an identified PN code signal and attempt to acquire synchronization. The magnitude of such side lobe signals can be increased by additive noise, channel distortion, deliberate jamming or truncation of the code sequence into isolated code words.

It is to be noted that side lobe signals do not occur uniformly over the N chips of the correlator, as do the true correlation indicating signals, side lobe signals occur more or less randomly over different portions of the N chips of the correlator as the received signal moves past the stored reference signal, depending upon the particular envelopes of the two signals. Thus, at any given instant, the generated side lobe signal could be confined almost entirely to a given half of the chip positions of the correlator. It is a primary object of the invention to significantly reduce the size of the side lobe signals by cancellation and also to decrease the effect of noise by cancellation, thereby enabling the use of a lower noise detection threshold level.

In a preferred form of the invention there is provided a signal correlation means having a length of N chips. A first adder means which includes signal summing means within the correlator adds together all of the individual signals from a first half of the N chips and also adds together all of the individual signals from the second half of the N chips. The total added together signals of the first and second halves of the N chips are then added together to produce a total summed output signal which is then rectified. Such total rectified output signal contains all of the side lobe signals, all of the noise signals and also the desired signal which indicates correlation when it occurs.

A differencing means produces a difference signal by taking the difference of the summed currents from the two halves of the N chips of the correlator. Since correlation results in a uniform increase in signal in all the chip positions, that portion of the total signal resulting from correlation will cancel out when the signal in one half of the correlator chips is subtracted from the signal in the other half of the correlator chips. Thus, the difference signal will contain no desired correlation signal, but will contain the side lobe signals generated in one half of the N chips to the extent that such side lobe signals exceed the side lobe signals in the other half of the N chips, at any instant of time. Further, such difference signal will contain noise in an amount substantially equal to that in the added halves of the N chips. Since the noise is random both in positive and negative polarity, it is just as likely that noise signals of opposite polarity will be subtracted (which is the equivalent of addition) as it is that noise signals of the same polarity will be subtracted from each other.

The output of the differencing means is then rectified as was the output of the adder means, to make all of the signals, including side lobe signals, noise and correlation indicating signals of the same polarity.

A second differencing means subtracts the rectified difference signal from the total rectified output signal from the first adder means (and rectifying means) to substantially reduce both the side lobe signal level and the noise level which were present in the received input signal.

Integrator means is provided to integrate the rectified difference signal to produce a mean noise level which is then employed as the detection threshold level for the correlation indicating signals appearing at the output of the second difference means.

Figure 1:
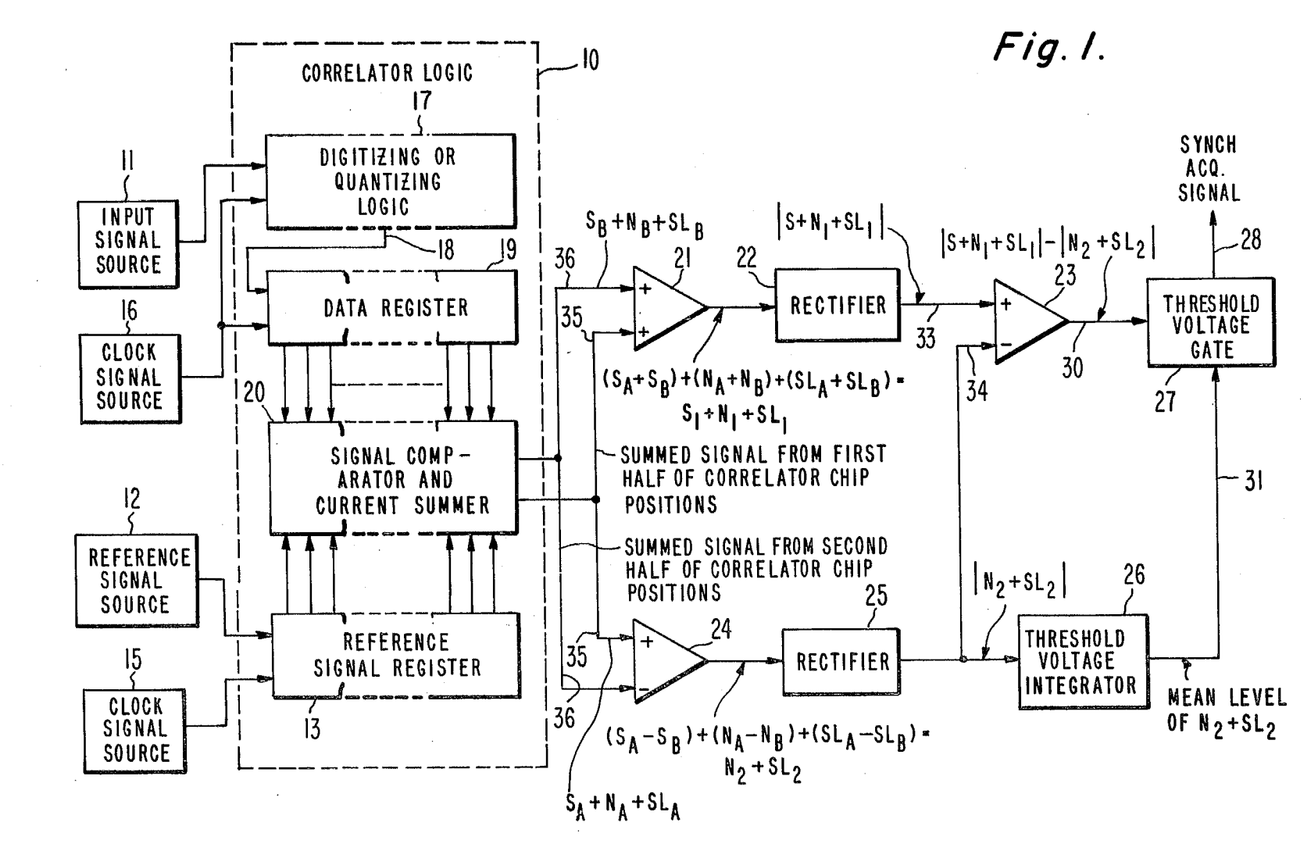
FIG. 1 is a block diagram of one form of the invention employing a single correlator.

In FIG. 1 the correlator 10 functions to compare an input signal received from input signal source 11 with a reference signal supplied from reference signal source 12 to identify a coded signal which occurs (usually periodically) in the said received signal from source 11.

The reference signal, which is essentially a duplication of the received signal to be identified, is clocked into and stored in the reference signal register 13 by clock signals from clock signal source 15. The input signal received from source 11, usually analog in nature, is first supplied to digitizing or quantizing logic 17 where it is changed either into bits or into pulses having amplitudes proportional to the amplitude of those portions of the input signal from which they are taken. Assume, for purposes of discussion, that the logic 17 changes the received input signal into amplitude samples. The pulses are formed at the frequency rate of clock signal source 16 and then are continuously supplied to data register 19 in serial manner via lead 18 under the control of, and at the frequency of, the clock pulses from source 16. Register 19 can be any one of several known types of registers capable of receiving and storing amplitude pulses, such as a charge coupled device, for example.

The number N of chip positions (to be compared) in the data register 19 and in the reference signal register 13 are equal, with terminals from each pair of corresponding chip positions being connected to the corresponding one of the signal comparing means contained in the signal comparator and current summer logic 20. Specifically, the signal comparator and current summer means 20 contains N individual signal comparing and current generating means, each of which is responsive to a given pair of corresponding chip positions of the registers 19 and 13.

In accordance with the design of the comparator and current summer 20, the amount of current generated by coincident or non-coincident comparisons can be either proportional to the amplitude of the samplings of the received signal or can be of a constant value, regardless of amplitude, as in the case where both input signal and reference signal are digitized.

Figure 2:
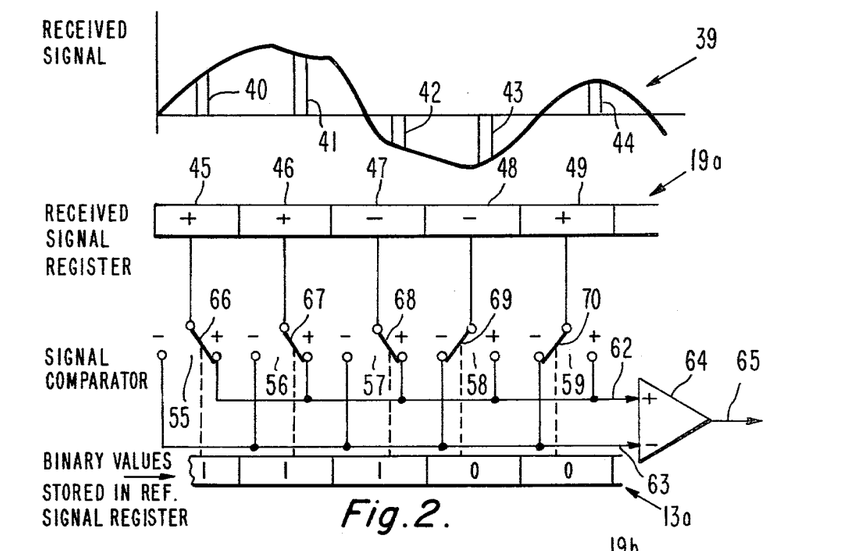
FIG. 2 illustrates one manner in which a correlator compares a binary representation of a reference signal with an amplitude sampling of an input signal.
Figure 3:
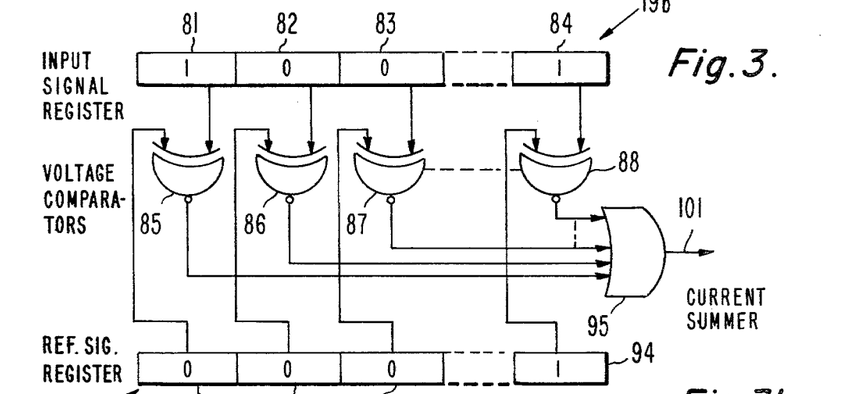
FIGS. 3, 3a and 3b illustrate one manner in which a correlator compares binary representations of both the input signal and the reference signal.

Before continuing with a discussion of FIG. 1, the more detailed showing of correlators, as shown in FIGS. 2 and 3, will be discussed in order to provide a better background for understanding FIG. 1.

In FIG. 2, the generated current in each correlator bit position is assumed to be proportional to the amplitude of the sample in the received signal register 19a. Specifically, in FIG. 2, amplitude samples 40–44 of a portion of the received signal 39 are stored, respectively, in bit positions 45–49 of received signal register 19a, which can be a charge coupled device, for example.

The bits stored in the corresponding bit positions of the reference signal register 13a is 11100 and are represented by, and physically control, the state of the switches 55–59, respectively, which can be electronic switches. Specifically, binary 1's close their associated switch arms upon the negative or inverting bus bar 63. Thus, switch arms 66 and 67 are closed upon positive bus bar 62 to conduct positive currents from bit positions 45 and 46 of the received signal register 19a, which constitute two instances of coincidence. Arm 69 conducts a negative current from bit position 48 of input signal register 19a to the negative or inverting bus bar 63, which inverts said negative current to produce a positive current on the output terminal 65 of device 64, another example of coincidence.

Arms 68 and 70, respectively, connect negative and positive currents from bit positions 47 and 49 of register 19a to positive and negative bus bars 62 and 63, respectively, both examples of non-coincidence. The negative current from bit position 47 subtracts from the signal on output terminal 65 of device 64 and the positive current from bit position 49 subtracts from the output signal of device 64, since it is inverted thereby.

Figure 3A:
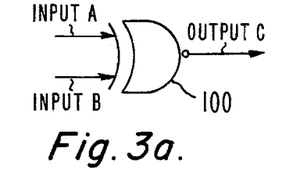
Figure 3B:
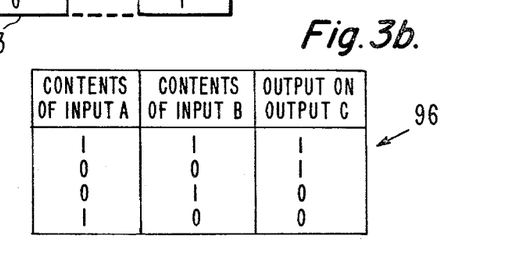

FIGS. 3, 3a and 3b show means for comparing the binary representation of the reference signal with a digitized binary input signal, i.e., an input signal represented by binary 1's and 0's depending on whether the sampled portion of the input signal is greater or less than a reference voltage, such as ground potential.

In FIG. 3 the input signal register 19b contains a binary 100 - - - 1 in bit (chip) positions 81–84, respectively. The reference signal register 13b contains a binary 000 - - - 1 in bit positions 91–94, respectively. Coincidence exists between chip positions 82, 83 and 84 of register 19b and chip positions 92, 93 and 94 of register 13a, and non-coincidence exists between bit position 81 of register 19b and bit position 91 of register 13b. The exclusive NOR gates 85–88 respond to various combinations of binary inputs as shown in the truth table of FIG. 3b. For purposes of interpreting the truth table of FIG. 3b, an exclusive NOR gate 100 is shown separately in FIG. 3a with its two input terminals identified as Input A and Input B and its output terminal as Output C. It is evident that the output signals of exclusive NOR gates 85–88 will be binary 1's (a positive voltage) if coincident signals are supplied to their two input terminals, and will be a binary 0 (a negative voltage) if non-coincident signals are supplied to their two input terminals.

The current signal summer circuit 95 sums together the output signals from all of the exclusive NOR gates 85–88, (subtracting negative currents from positive currents in devices that have negative outputs) with the resulting current appearing on output terminal 101.

Figure 4:
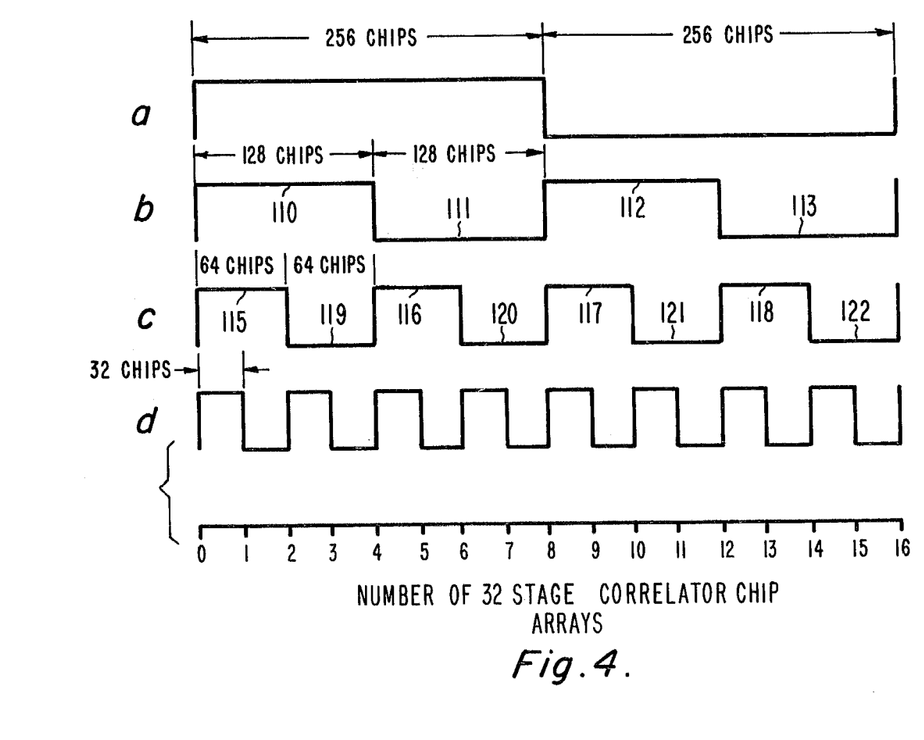
FIG. 4 (comprised of a-d) shows various options for partitioning the correlator chips.

In accordance with the present invention, the chip positions of the correlator (which includes the corresponding bit positions of the input signal register 19b, the reference signal register 13b and the voltage comparator) are divided into two equal groups with the current from each group being separately summed. The partitioning of the bit positions can be done in any of several ways, as shown in FIG. 4, which assumes a total of 512 chip positions made up of sixteen 32 stage correlation arrays. FIG. 4a shows a division of the 512 chips into two sub-groups each of 256 adjacent chip positions. FIG. 4b shows the 512 chip positions divided into four sub-groups, each consisting of 128 chips and with the currents generated in sub-group 110 and sub-group 112 being summed together and the currents in sub-groups 111 and 113 being summed together. FIG. 4c shows the 512 chip positions being divided into eight sub-groups with currents from the sub-groups 115, 116, 117 and 118 being summed together and the currents from the alternate sub-groups 119, 120, 121 and 122 being summed together. Similarly, the currents from the eight odd sub-groups of chip positions of FIG. 4d are summed together and the currents from the alternate eight sub-groups of chip positions are summed together.

Returning again to FIG. 1, assume that there are 512 chip positions in correlator 10, divided into two equal groups of 256 chip positions each. The summed currents from each of the two equal groups of 256 chip positions of signal comparator and current summer 20 of correlator 10 are supplied via output terminals 35 and 36 to the two inputs of signal adder 21. The output signal on terminal 35 is:

$$S_A + N_A + SL_A$$

and the output signal on terminal 36 is:

$$S_B + N_B + SL_B$$

where $S_A$ and $S_B$ are the desired correlation indicating signals, $N_A$ and $N_B$ are noise signals, and $SL_A$ and $SL_B$ are side lobe signals.

The output signal of adder 21 is then:

$$S_A + N_A + SL_A + S_B + N_B + SL_B = S + N_1 + SL_1$$

where $S$ is the total desired correlation indicating signal, $N_1$ is the total noise and $SL_1$ is the total side lobe signal.

The summed currents from each of the two sub-groups of 256 chip positions of correlator 10 are also supplied to the two input terminals of difference logic device (differencer) 24 whose output is:

$$(S_A + N_A + SL_A) - (S_B + N_B + SL_B) = N_2 + SL_2$$

where $N_2$ is noise and $SL_2$ is the side lobe signal.

The output signals from both adder 21 and differencer 24 are rectified to a positive polarity by rectifiers 22 and 25, respectively, and then respectively supplied to non-inverting input terminal 33 and inverting input terminal 34 of differencer 23, whose output signal then becomes:

$$|S + N_1 + SL_1| - |N_2 + SL_2| = S + (N_1 - N_2) + (SL_1 - SL_2)$$

The resultant side lobe voltage $(SL_1 - SL_2)$ is less than $SL_1$ to the extent that the side lobe signal $SL_A$ in the first sub-group of chip positions in the correlator is different from the side lobe signal $SL_B$ in the second half of the correlator chip positions. Very often such difference will be so substantial that the addition of the side lobe signal $(SL_A + SL_B)$ in adder 21 will be similar in magnitude to the difference $(SL_A - SL_B)$ of the side lobe signal in differencer 24. For example, of $SL_A = 1.0$ volt and $SL_B = 0.2$ volts, the sum of the two voltages, $SL_1$, is 1.2 volts and the difference, $SL_2$, is 0.8 volts. Thus when $|SL_2|$ is subtracted from $|SL_1|$ in differencer 23, the resulting side lobe signal $|SL_1| - |SL_2|$ is equal to 0.4 volts, a considerable reduction from the initial side lobe signal, $SL_A$, which was equal to 1.0 volts.

The noise signals $N_A$ and $N_B$ existing in the two groups of chip positions of comparator 20 are random in nature, containing both positive and negative excursions and are substantially equal in total energy. (Consequently, the addition of the noise signals $N_A$ and $N_B$ is usually substantially equal to the difference of the two noise signals $(N_A - N_B)$. However, when they are rectified to become unipolar signals $|N_A + N_B| = |N_1|$ and $|N_A - N_B| = N_2$, the difference value of $|N_1| - |N_2|$ represents a substantial reduction in the resulting noise signal appearing on the output terminal of differencer 23. Thus, the resulting signal appearing at the output terminal 30 of differencer 23 has a considerably higher signal-to-noise ratio than did the originally received signal, thereby permitting the use of a lower noise threshold level to obtain a given constant false alarm rate (CFAR).

The noise threshold level is determined by integrating the signal output from rectifier 25 in integrating means 26 to produce a mean noise level which is supplied to the threshold voltage gate 27 to control the threshold voltage.

The foregoing structure results in a relatively reliable CFAR since the threshold voltage generated by integrator 26 increases or decreases automatically as the noise level increases or decreases, thus enhancing system efficiency and sensitivity.

The signal appearing on the output terminal 28 of the threshold voltage gate 27 represents the occurrence of the received PN code signal and can be employed to acquire synchronization by well-known means, not shown herein and not a part of the present invention.

In some receivers it is necessary to provide for dual correlation of the received signal with a reference signal, as for example, in in-phase and quadrature detection or in tracking systems where it is desired to determine tracking error signals by employing early and late clocking signals.

Figure 5:
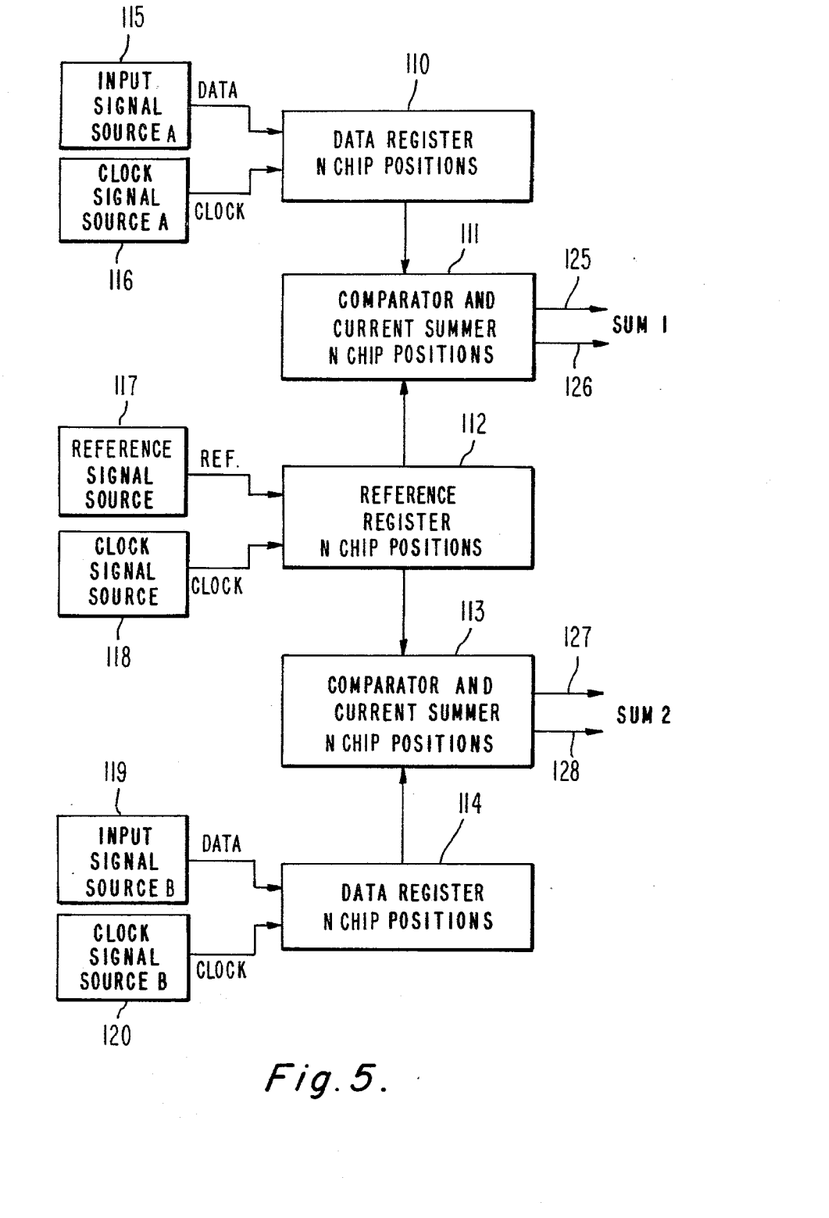
FIG. 5 is a block diagram of a dual correlator.

FIG. 5 shows the general arrangement for dual correlation. Input signals from sources A and B, which can be the outputs from the I and Q channels of a receiver, designated generally in FIG. 5 as input signal sources 115 and 119, are supplied to data registers 110 and 114, respectively, by means of clock signals from clock signal sources 116 and 120.

The reference signal from source 117 is entered into reference register 112 by a clock signal from clock signal source 118. Voltage comparators and current summers 111 and 113 compare the stored reference signal with the input signals entered into data registers 110 and 114, respectively. The summed currents from two equal groups of chip positions in the comparator 111 appear on output terminals 125 and 126 and the summed currents from two equal groups of bit positions in comparator 113 appear on output terminals 127 and 128.

Figure 6:
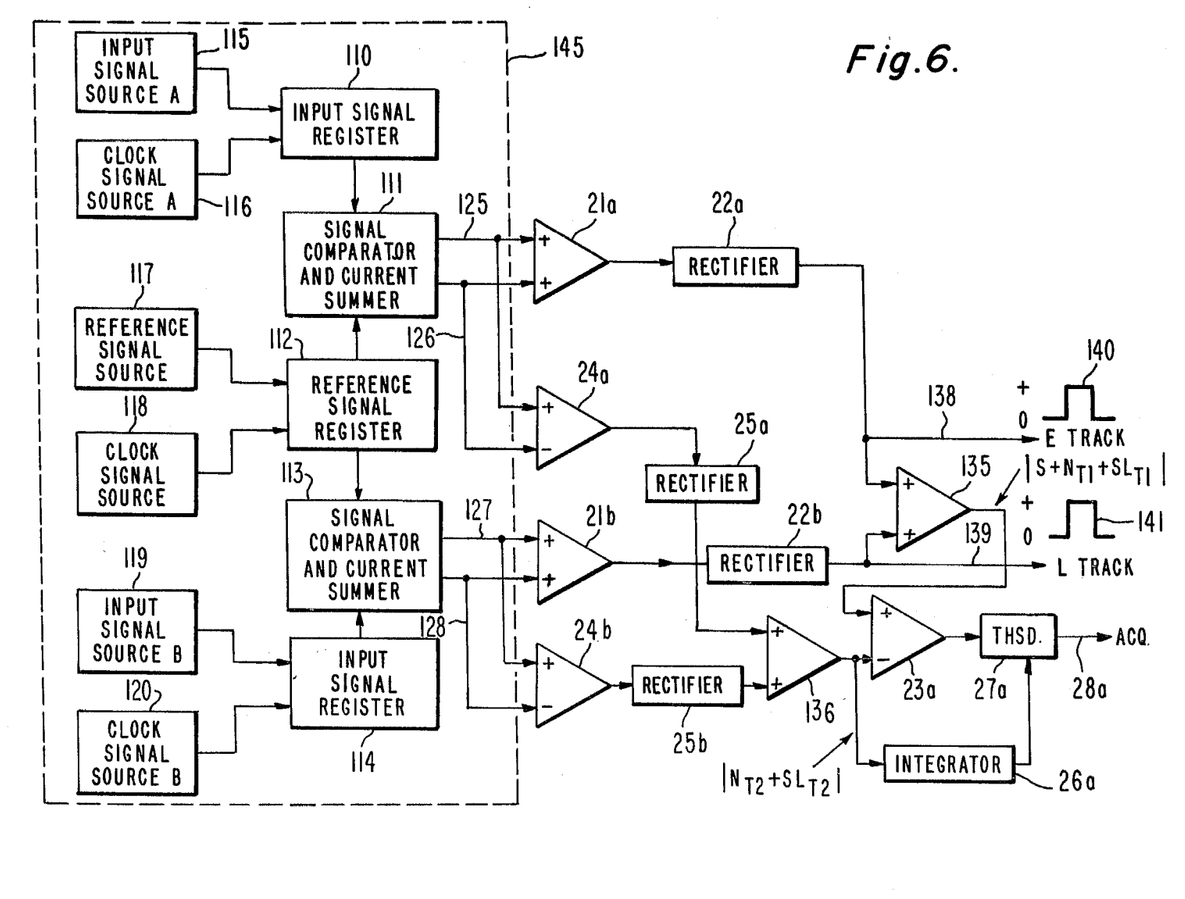
FIG. 6 is a block diagram of another form of the invention employing a dual correlator.

FIG. 6 shows the logic employed to process the output of a dual correlator in accordance with one form of the invention. The portion of FIG. 6 within the dotted block 145 is the same dual correlation structure shown in FIG. 5, with corresponding elements being identified by the same reference characters. The remaining logic of FIG. 6 is similar to the logic shown to the right of the correlator logic 10 shown in FIG. 1, except that FIG. 6 shows dual arrangements of such logic. More specifically, adder 21a, differencer 24a and rectifiers 22a and 25a, of FIG. 6, correspond to and function in the same manner as adder 26, differencer 24 and rectifiers 22 and 25 of FIG. 1. Similarly, adder 21b differencer 24b, and rectifiers 22b and 25b of FIG. 6 correspond to and function in the same manner as adder 21, differencer 24 and rectifiers 22 and 25 of FIG. 1.

The adder 135 functions to add together the rectified output signals of adders 21a and 21b and the adder 136 functions to add together the rectified output signals of differencers 24a and 24b to produce total summations $|S_T+N_{T1}+SL_{T1}|$ and total differences $|N_{T2}+SL_{T2}|$ of the output signals from combined corresponding sub-groups of the two sub-groups of chip positions of the two comparators 111 and 113. It should be noted that squaring of the signals is equivalent to rectification.

The differencer 23a functions in the same manner as differencer 23 in FIG. 1 to subtract the total rectified noise and side lobe signals $|N_{T2}+SL_{T2}|$ supplied from adder 136, from the total summed and rectified signal $|S_T+N_{T1}+SL_{T1}|$ supplied from adder 135. Integrator 26a integrates the noise and side lobe signals $|N_T+SL_T|$ to produce a mean level of noise which is then supplied to threshold gate 27a. The correlation indicating signals S, which ordinarily exceeds the mean noise level, appear on the output terminal 28a of threshold voltage gate 27a and can be employed to acquire synchronization of the received signal.

In some type circuits, such as those employed for tracking, complete or partial loss of synchronization is a problem because of the movement of the tracked object. Such loss of synchronization can often be prevented by detecting it at its inception. Specifically, such loss can be prevented by clocking the received input signal into one of the two input signal registers (register 110 of FIG. 6) early and into the other input signal register (register 114) late. The correlation indicating output signals resulting from the early and late clocked input signal will be substantially equal if synchronization remains therebetween. However, should loss of synchronization begin to occur, one of the output signals on terminals 138 and 139 will increase and the ohter output signal will decrease. Control means (not shown) will respond to the changing difference of amplitude of the two output signals on terminals 138 and 139 to advance or retard the synchronization signal in a correcting direction.

What is claimed is:

1. Means for reducing side lobe signals and noise signals generated in a correlator having N chip (bit) positions for comparing a received coded input signal with a stored reference signal and comprising:
   adding means for producing a total summed and rectified signal consisting of all the signals generated by said correlator in each chip position thereof;
   first differencing means for producing a total differenced signal consisting of the rectified difference of the total summed signals generated in a first half of the N chip positions of said correlator from the total summed signals generated in the second half of N chip positions of said correlator; and
   second differencing means for taking the difference between said total differenced signal and said total summed and rectified signal to produce enhanced output signals.

2. A side lobe signal reudcing means as in claim 1 and further comprising:
   integrating means for integrating said total differenced signal to produce a mean noise level signal; and
   gating means responsive to said mean noise level signal to pass therethrough said enhanced output signals from said second differencing means whose magnitudes exceed that of said mean noise level signal.

3. In a system for identifying a received coded signal by a correlator means of N chip (bit) positions which compare the received signal with a reference signal to produce coincidence and non-coincidence indicating signals, a side lobe signal reduction means comprising:
   logic means for adding together and rectifying all of the correlator output signals to produce a total summed and rectified correlator output signal;
   first differencing means for subtracting the summed individual coincidence and non-coincidence indicating output signals from one half of the correlator chip positions from the summed individual coincidence and non-coincidence indicating output signals from the other half of correlator chip positions to produce a total difference correlator output signal;
   means for rectifying said total difference correlator output signal; and
   second differencing means for subtracting the rectified total difference correlator signal from said total summed correlator output signal to produce an enhanced output signal.

4. A side lobe reducing circuit as in claim 3 and further comprising:
   integrating means for integrating the said rectified total difference correlator output signal to produce a mean noise level signal; and
   gating means responsive to said mean noise level signal to pass therethrough said enhanced output signals from said second differencing means whose magnitudes exceed that of said mean noise level signal.

5. Means for reducing side lobe signal and noise signals generated in a dual correlation circuit comprising first and second correlators each having N chip positions for comparing first and second input signals with a reference signal and comprising:
   means for producing a total summed and rectified signal consisting of all of the signals generated by said first and second correlators in each chip position thereof;
   first differencing means for producing a total difference signal consisting of the rectified difference between the total summed signals generated in a first half of the N chip positions of each of said first and second correlators and the total summed signals generated in each of the second half of N chip positions of said first and second correlators; and
   second differencing means for taking the difference between said total difference signal and said total summed and rectified signal to produce an enhanced output signal.

6. A side lobe reducing circuit as in claim 5 and further comprising:
   integrating means for integrating the said total difference signal to produce a mean noise level signal; and
   gating means responsive to said mean noise level signal to pass therethrough said enhanced output signal from said second differencing means whose magnitudes exceed that of said means noise level signal.

* * * * *

UNITED STATES PATENT AND TRADEMARK OFFICE
CERTIFICATE OF CORRECTION

PATENT NO. : 4,224,679

DATED : September 23, 1980

INVENTOR(S) : Edward Joachim Nosse, et al

It is certified that error appears in the above-identified patent and that said Letters Patent is hereby corrected as shown below:

Column 3, line 10, delete "(comprised of a-d)";

Column 7, line 61, "reudcing" should be ---reducing---;

Column 8, line 65, "means" should be ---mean---.

Signed and Sealed this

Twenty-eighth Day of April 1981

[SEAL]

Attest:

RENE D. TEGTMEYER

Attesting Officer

Acting Commissioner of Patents and Trademarks